US011483161B2

(12) United States Patent
Liu et al.

(10) Patent No.: US 11,483,161 B2
(45) Date of Patent: Oct. 25, 2022

(54) METHOD FOR INFORMATION PROCESSING AND NON-TRANSITORY COMPUTER READABLE STORAGE MEDIUM

(71) Applicant: LAUNCH TECH CO., LTD., Shenzhen (CN)

(72) Inventors: Xin Liu, Shenzhen (CN); Jun Zhou, Shenzhen (CN)

(73) Assignee: LAUNCH TECH CO., LTD., Shenzhen (CN)

( * ) Notice: Subject to any disclaimer, the term of this patent is extended or adjusted under 35 U.S.C. 154(b) by 160 days.

(21) Appl. No.: 17/038,624

(22) Filed: Sep. 30, 2020

(65) Prior Publication Data

US 2021/0014072 A1 Jan. 14, 2021

Related U.S. Application Data

(63) Continuation of application No. PCT/CN2019/124531, filed on Dec. 11, 2019.

(30) Foreign Application Priority Data

Dec. 20, 2018 (CN) .......................... 201811567036.2

(51) Int. Cl.
*H04L 29/06* (2006.01)
*H04L 9/32* (2006.01)
(Continued)

(52) U.S. Cl.
CPC .......... *H04L 9/3247* (2013.01); *G06F 21/602* (2013.01); *G06F 21/604* (2013.01);
(Continued)

(58) Field of Classification Search
None
See application file for complete search history.

(56) References Cited

U.S. PATENT DOCUMENTS

2017/0155515 A1 6/2017 Androulaki et al.

FOREIGN PATENT DOCUMENTS

CN 107566116 A 1/2018
CN 109040026 A 12/2018
(Continued)

OTHER PUBLICATIONS

The International Search Report issued corresponding PCT application No. PCT/CN2019124531 dated Mar. 4, 2020.
(Continued)

*Primary Examiner* — Andrew J Steinle
(74) *Attorney, Agent, or Firm* — Hauptman Ham, LLP

(57) ABSTRACT

The present disclosure discloses a method and a device for information processing. The method includes the following. A block chain node receives a digital asset processing request, where the digital asset processing request is used for requesting authority to process the digital assets. Upon receiving the digital asset processing request, the block chain node sends an authorization request to each of M electronic devices, where the authorization request is used for requesting authorization to process the digital assets. The block chain node determines that each of at least N electronic devices of the M electronic devices provides the authorization to process the digital assets, where M is greater than or equal to N. The block chain node determines to obtain the authority to process the digital assets.

7 Claims, 7 Drawing Sheets

(51) Int. Cl.
*G06F 21/60* (2013.01)
*H04L 9/06* (2006.01)
*H04L 9/14* (2006.01)
*H04L 9/30* (2006.01)
*H04L 9/00* (2022.01)

(52) U.S. Cl.
CPC ............. *H04L 9/0637* (2013.01); *H04L 9/14* (2013.01); *H04L 9/30* (2013.01); *H04L 9/50* (2022.05)

(56) References Cited

FOREIGN PATENT DOCUMENTS

| | | | | |
|---|---|---|---|---|
| CN | 109697365 A | 4/2019 | | |
| CN | 110019516 B * | 8/2021 | ............ | G06F 16/27 |
| GB | 2540977 A | 2/2017 | | |
| WO | 2018111295 A1 | 6/2018 | | |
| WO | WO-2018111295 A1 * | 6/2018 | ............ | G06F 21/00 |

OTHER PUBLICATIONS

The Extended European Search Report issued corresponding EP Application No. EP19900509.1 dated Oct. 4, 2021.

\* cited by examiner

METHOD FOR INFORMATION PROCESSING AND NON-TRANSITORY COMPUTER READABLE STORAGE MEDIUM

CROSS-REFERENCE TO RELATED APPLICATION(S)

This application is a continuation of International Application No. PCT/CN2019/124531, filed on Dec. 11, 2019, which claims priority to Chinese Patent Application No. 201811567036.2, filed on Dec. 20, 2018, the entire disclosures of which are hereby incorporated by reference in their entireties.

TECHNICAL FIELD

This disclosure relates to the technical field of computers, and more particularly to a method for information processing and a non-transitory computer readable storage medium.

BACKGROUND

Digital assets refer to non-monetary assets obtained or controlled by enterprises or individuals, existing in the form of electronic data, held in daily activities for sale, or in the process of production.

In the network era, network accounting, office automation, and electronic payment system platform make the current production mode have incomparable advantages over the traditional production mode. This results in a series of "0" and "1" codes relying on magnetic media. These codes are digital commodities with the nature of assets, namely digital assets. This kind of digital asset has the characteristics of high price, strong dependence, strong interaction, unlimited quantity, and diminishing cost.

Centralized management for transactions of the digital assets may easily lead to centralized fraud. If the central management system is broken through, it will also cause the central management system to be impersonated. Therefore, this centralized management for the transactions of the digital assets is insecure.

Accordingly, digital asset is a topic being studied by those skilled in the art.

SUMMARY

In a first aspect, embodiments of the present disclosure provide a method for information processing. The method includes the following.

A block chain node receives a digital asset processing request, where the digital asset processing request is used for requesting authority to process digital assets.

Upon receiving the digital asset processing request, the block chain node sends an authorization request to each of M electronic devices, where the authorization request is used for requesting authorization to process the digital assets.

The block chain node determines that each of at least N electronic devices of the M electronic devices provides the authorization to process the digital assets, where M is greater than or equal to N.

The block chain node determines to obtain the authority to process the digital assets.

In the embodiments of the present disclosure, after receiving the digital asset processing request, the block chain node sends the authorization request in the digital asset processing request to other M electronic devices, where the authorization request is used for requesting authorization to process the digital assets. When the block chain node determines that each of the at least N electronic devices provides the authorization to process the digital assets, the block chain node obtains the authority to process the digital assets. According to the embodiments of the present disclosure, for certain digital assets, when the block chain node initiates or receives the digital asset processing request to obtain the authority to process the digital assets and the digital asset processing request includes the authorization request, the block chain node can send the authorization request to other electronic devices. In this way, transaction can be authorized by multi-party (i.e., multiple parties) by determining a proportion of sign-to-authorize of other electronic devices, and the efficiency of multi-party authorization can be effectively improved.

In an implementation, before the block chain node determines to obtain the authority to process the digital assets, the following is further conducted.

The block chain node provides the authorization to process the digital assets.

The block chain node determines to obtain the authority to process the digital assets as follows.

When the block chain node provides the authorization to process the digital assets, the block chain node determines to obtain the authority to process the digital assets.

In the embodiments of the present disclosure, the digital asset processing request is executed (or processed) only when the block chain node provides the authorization to process the digital assets. It is possible to effectively avoid that the digital asset processing request is processed incorrectly when the identity authorization for the block chain node fails, where the failure is caused by the error of the identity information of the block chain node. As such, the security of the authorization process can be effectively improved.

In an implementation, the digital assets are digital assets encrypted by a target public key, and a target private key corresponding to the target public key includes a first decentralized key. The first decentralized key is stored in the block chain node. The block chain node provides the authorization to process the digital assets as follows.

The block chain node obtains a first authorized key by signing the digital assets through the first decentralized key, and determines to provide the authorization to process the digital assets according to the first authorized signature.

In the embodiments of the present disclosure, the block chain node itself can authorize the digital assets through the first decentralized key stored therein. It is possible to prevent illegal users from initiating the authorization request through the block chain node, avoid the risk of embezzling the digital assets, and improve the security in the transaction process of the digital assets.

In an implementation, the target private key further includes M decentralized keys, and the M decentralized keys are stored in the M electronic devices respectively. The M decentralized keys are in one-to-one correspondence with the M electronic devices. N decentralized keys in the M decentralized keys are used for signing the digital assets to obtain N authorized signatures.

After the block chain node determines that each of the at least N electronic devices of the M electronic devices provides the authorization to process the digital assets, the following is further conducted.

The block chain node synthesizes the first authorized signature and the N authorized signatures to obtain a target signature result.

The block chain node synthesizes the target private key according to the target signature result to obtain a synthesized target private key.

The block chain node determines to obtain the authority to process the digital assets as follows.

The block chain node determines to obtain the authority to process the digital assets when the target public key is decrypted with the synthesized target private key.

In the embodiments of the present disclosure, the first authorized signature and the N authorized signatures are synthesized into the target signature result. The synthesized target private key is then obtained through the target signature result. Thereafter, the digital assets encrypted by the target public key is decrypted with the synthesized target private key. Finally, the block chain node is determined to obtain the authority to process the digital assets. As a result, the security of the authorization process can be effectively ensured.

In an implementation, after the block chain node determines to obtain the authority to process the digital assets, the following is further conducted.

The block chain node generates a signature record according to the target signature result.

The block chain node stores the signature record to a block chain ledger.

In the embodiments of the present disclosure, by storing the signature record to the block chain ledger, a transaction record of the digital assets can be stored in time and the accuracy in the transaction process of the digital assets can be effectively improved.

In a second aspect, embodiments of the present disclosure further provide a method for information processing. The method includes the following.

An electronic device receives an authorization request, and the authorization request is used for requesting authorization to process digital assets.

The electronic device authorizes processing of the digital assets to obtain an authorization result.

The electronic device sends the authorization result to a block chain node.

In the embodiments of the present disclosure, the electronic device processes the authorization request, and when the electronic device authorizes processing of the digital assets, the electronic device sends the authorization result to the block chain node. Consequently, the security of the authorization process can be improved.

In an implementation, the digital assets are digital assets encrypted by a target public key. A target private key corresponding to the target public key includes a second decentralized key. The second decentralized key is stored in the electronic device. The electronic device authorizes processing of the digital assets to obtain the authorization result as follows.

The electronic device signs the digital assets through the second decentralized key to obtain a second authorized signature, and determines to authorize processing of the digital assets according to the second authorized signature.

In the embodiments of the present disclosure, the electronic device signs the digital assets through the second decentralized key. As the second decentralized key is unique, not only the legitimacy of the electronic device can be ensured, but also the confidentiality in the transaction process of the digital assets can be ensured, improving the security of the transaction of the digital assets.

In a third aspect, embodiments of the present disclosure further provide a non-transitory computer readable storage medium. The non-transitory computer readable storage medium is configured to store a computer program which, when executed by a processor, the processor is configured to execute the method of the first aspect.

BRIEF DESCRIPTION OF THE DRAWINGS

In order to describe technical solutions of embodiments of the present disclosure or the related art more clearly, the following will give a description of the accompanying drawings used for the embodiments and the background of the present disclosure.

DETAILED DESCRIPTION

In order to make the objects, technical solutions and advantages of the present disclosure more clear, the present disclosure will be described in detail below in combination with the accompanying drawings.

The terms "first", "second" and the like in the specification, the claims, and the accompany drawings of the present disclosure are used to distinguish different objects rather than describe a particular order. In addition, the terms "comprise", and "have" as well as variations thereof are intended to cover a non-exclusive inclusion. For example, a process, method, system, product, or device including a series of steps or units is not limited to the listed steps or units, but optionally further includes steps or units not listed, or optionally further includes other steps or units inherent to these processes, methods, or devices.

The embodiments of the present disclosure will be described below with reference to the accompanying drawings.

Figure 1:
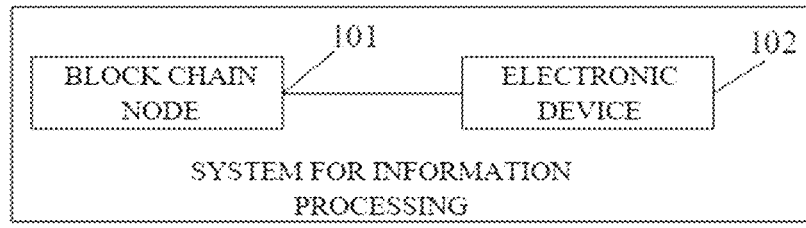
FIG. 1 is a schematic diagram illustrating an architecture of a system for information processing according to embodiments of the present disclosure.

FIG. 1 is a schematic diagram illustrating an architecture of a system for information processing according to embodiments of the present disclosure. As illustrated in FIG. 1, the system for information processing includes a block chain node 101 and an electronic device 102, where the electronic device includes M electronic devices. The block chain node 101 and the electronic device 102 are communicatively connected, for example, through wireless connection and the like. The manner of the communication connection between the block chain node and the electronic device is not limited herein.

Herein, the block chain platform can encrypt digital assets through a target public key, and decrypt the digital assets with a target private key corresponding to the target public key. That is, the target public key and the target private key are presented in pairs. In an example, the digital assets can be encrypted by public key encryption algorithm, such as asymmetric cryptographic algorithm RSA, public key cryptographic algorithm SM2 based on elliptic curves, and the like. The target private key is divided into (M+1) decentralized keys, and the (M+1) decentralized keys are stored in the block chain node and the electronic devices (i.e. one block chain node and M electronic devices) respectively. The block chain node and M electronic devices each store one corresponding decentralized key. In other words, the private key of the digital assets can be divided into (M+1) copies, which are respectively sent to the one block chain node and the M electronic devices. It will be appreciated that, encryption algorithms are not limited herein.

In the embodiments of the present disclosure, the block chain node receives a digital asset processing request, where the digital asset processing request is used for requesting authority to process digital assets. The block chain node sends an authorization request to each of the M electronic devices, where the authorization request is used for requesting authorization to process digital assets. The M electronic device receive the authorization request from the block chain node and send at least N authorization results from other block chain nodes to the block chain node. The block chain node determines that it obtains the authority to process the digital assets.

Figure 2A:
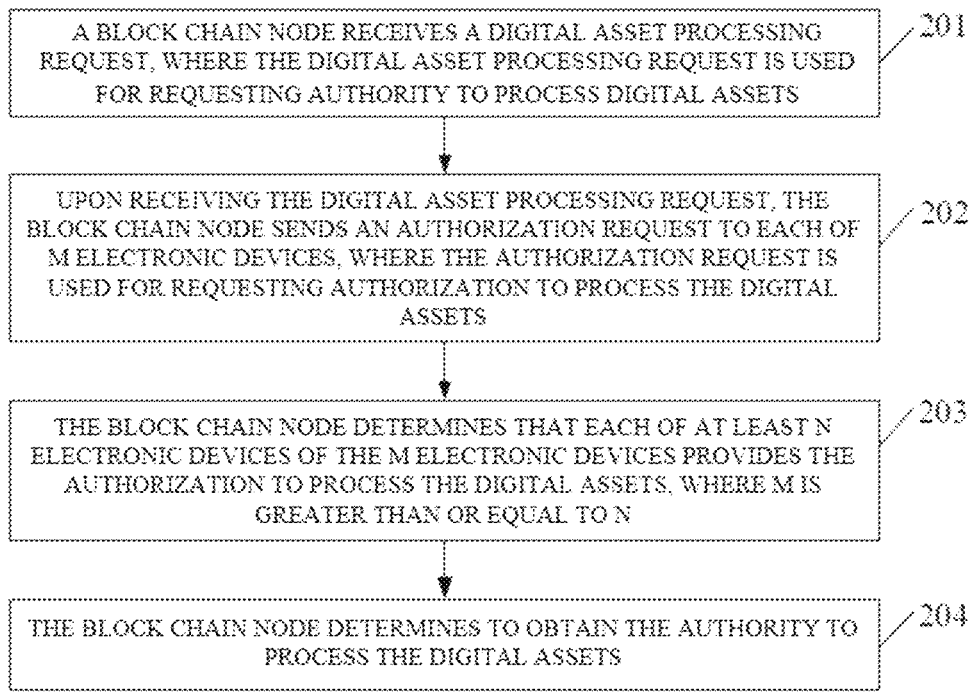
FIG. 2a is a schematic flowchart illustrating a method for information processing according to embodiments of the present disclosure.

FIG. 2a is a schematic flowchart illustrating a method for information processing according to embodiments of the present disclosure. The method can be applied to the block chain node in the architecture shown in FIG. 1. As shown in FIG. 2a, the method begins at 201.

At 201, the block chain node receives a digital asset processing request, where the digital asset processing request is used for requesting authority to process digital assets.

In the embodiments of the present disclosure, the block chain node can receive the digital asset processing request input by a user, or sent from other devices, such as a block chain platform or other servers. The source of the digital asset processing request received by the block chain node is not limited herein.

In the embodiments of the present disclosure, the block chain node can be a computer in a block chain network, including a mobile phone, a mining machine, a desktop computer, a server, or the like. The digital assets can be valuable files such as songs, videos, contracts, data files, and the like. For example, the digital assets can be a house leasing contract. The house leasing contract can include the identity information of the lessor, the basic situation of the house, the payment period and manner of rent and deposit, the payment manners of utilities, cleaning fees, telephone fees, and maintenance fees, the changes of the lessor and the lessee, the responsibilities of the lessee, the responsibilities of the lessor, and the relevant provisions of the lease period and the expiration of the contract. It will be appreciated that, the contents of the digital assets are not limited herein.

In the embodiments of the present disclosure, the block chain node can receive the digital asset processing request, where the digital asset processing request can be a processing request to authorize, trade, divide, transfer, move, purchase, lease, copy, and/or view the digital assets, which is not limited herein.

At 202, upon receiving the digital asset processing request, the block chain node sends an authorization request to each of M electronic devices, where the authorization request is used for requesting authorization to process the digital assets.

In the embodiments of the present disclosure, the electronic device may also be a block chain node. The authorization request can be understood as an authorized signature for the digital assets. For example, the authorization request may be a house leasing contract requiring Party A or Party B to sign and authorize, a property transfer agreement requiring signature and authorization, a confidential document requiring multi-party to authorize and sign, etc. It will be appreciated that, the embodiments of the present disclosure do not limit the form and contents of the authorization request.

In the embodiments of the present disclosure, the block chain node sends the authorization request to each of the M electronic devices. The block chain node can send the authorization request through network-wide broadcast. Alternatively, the block chain node can separately send the authorization request to the M electronic devices one by one. It will be appreciated that, the embodiments of the present disclosure do not limit the transmission manner.

According to the embodiments of the present disclosure, the block chain node can send the authorization request to the electronic devices quickly and accurately and the efficiency of the transmission can be effectively improved. It will be appreciated that, the embodiments of the present disclosure do not limit the transmission manner.

At 203, the block chain node determines that each of at least N electronic devices of the M electronic devices provides the authorization to process the digital assets, where M is greater than or equal to N.

In the embodiments of the present disclosure, the block chain node determines that each of at least N electronic devices of the M electronic devices authorizes the digital assets, where M is greater than or equal to N. According to the embodiment of the present disclosure, the N electronic devices authorize processing of the digital assets, which can ensure the uniqueness of the digital assets (that is, avoid double spending), prevent a certain party from tampering with the digital assets, and effectively ensure the legitimacy of the digital assets.

Herein, in the case that the digital assets refer to an encrypted file, the encrypted file is encrypted through a public key encryption algorithm. That is, the digital assets are encrypted through a public key. "M" can be understood as dividing the target private key corresponding to the target public key of the digital assets into (M+1) decentralized keys, and distributing the (M+1) decentralized keys to (M+1) devices one by one for storage. "N+1" can be the minimum number of copies needed to decrypt the digital assets, where M is greater than or equal to N and M and N each are integers greater than or equal to 1.

In an example, taking the digital assets as an encrypted file for explanation, the target private key of the digital assets is evenly divided into K copies. Although this method can achieve division of the target private key of the digital assets, it often cannot meet the market demand in practical application. Therefore, the embodiments of the present disclosure provides a method for dividing the target private key of the digital assets as follows.

In the embodiments of the present disclosure, the method for dividing the target private key of the digital assets can realize the division of the target private key of the digital assets through a key decomposition algorithm. In an example, it can be realized through the following procedures: input an original target private key, that is, the target private key of the digital assets; set the division parameters m and N, and calculate key-length=$C_m^{N-1}$ and subkey-length=$C_{m-1}^{N-1}$; generate key-length long key decomposition array N [i]=i, and generate M*subkey-length long sub-key array through distribution of the key decomposition algorithm; divide the target private key of the digital assets into block-num blocks in units of subkey-length length, and record the insufficient part as excess bytes; create m sub-files which are empty and fill parameters m, N, block-num, excess, and corresponding sub-key into the headers of the m sub-files respectively, and fill corresponding bytes in each block of the target private key of the digital assets into the sub-files according to the sub-key information, and do not proceed until all blocks are processed; add the rest parts to the tail of each sub-file to complete the division of the target private key of the digital assets, that is, (M+1) decentralized keys are obtained. Herein, after the division of the target private key of the digital assets is completed, the divided m parts of the target private key of the digital assets can be stored into m devices (i.e. block chain node devices and electronic devices) respectively. It will be appreciated that, embodiments of the present disclosure can also divide the target private key of the digital assets into (M+1) parts through the above-mentioned method and store the (M+1) parts into (M+1) devices (i.e. block chain node devices and electronic devices) respectively, which will not be described in detail herein.

According to the present disclosure, by dividing the target private key of the digital assets into (M+1) decentralized keys, "reducing the size and easy to keep" is achieved. Furthermore, it is possible to avoid recovering the original digital assets when the decentralized keys of any (M+1-N) sub-digital assets are damaged, and it is not enough to expose the original digital assets even when the decentralized keys of any less than N sub-digital assets are leaked. As such, the confidentiality and security of the digital assets can be effectively improved. It will be understood that, the method for dividing the target private key of the digital assets is only an example, which is not limited herein.

In the embodiments of the present disclosure, the block chain node determines that each of the at least N electronic devices of the M electronic devices provides the authorization to process the digital assets. Herein, the block chain node determines N according to the number of the authorized signatures received from the electronic devices. According to the embodiments of the present disclosure, it is possible to simply and quickly determine the number necessary for processing the digital assets by determining N, and avoid the situation that the digital asset processing request is unable to be done due to must to determine the (M+1) authorized signatures, improving the efficiency. It will be appreciated that, the embodiments of the present disclosure do not limit the manner of the determination described above.

At 204, the block chain node determines to obtain the authority to process the digital assets.

In the embodiments of the present disclosure, it can be understood that, the block chain node determines that the authority to process the digital assets corresponds to the digital asset processing request. For example, if the digital asset processing request is a processing request to authorize, trade, divide, transfer, move, purchase, lease, copy, and/or view the digital assets, the block chain node determines that the authority to process the digital assets can be operations to authorize, trade, divide, transfer, move, purchase, lease, copy, and/or view the digital assets. It will be appreciated that, the embodiments of the present disclosure do not limit the contents of the authority of the digital assets.

According to the embodiments of the present disclosure, when the block chain node receives the digital asset processing request and the digital asset processing request includes the authorization request, the block chain node can send the authorization request to other electronic devices, to avoid double spending. Furthermore, transaction can be authorized by multi-party by determining a proportion of sign-to-authorize of other electronic devices, improving the efficiency of multi-party authorization effectively.

Figure 2B:
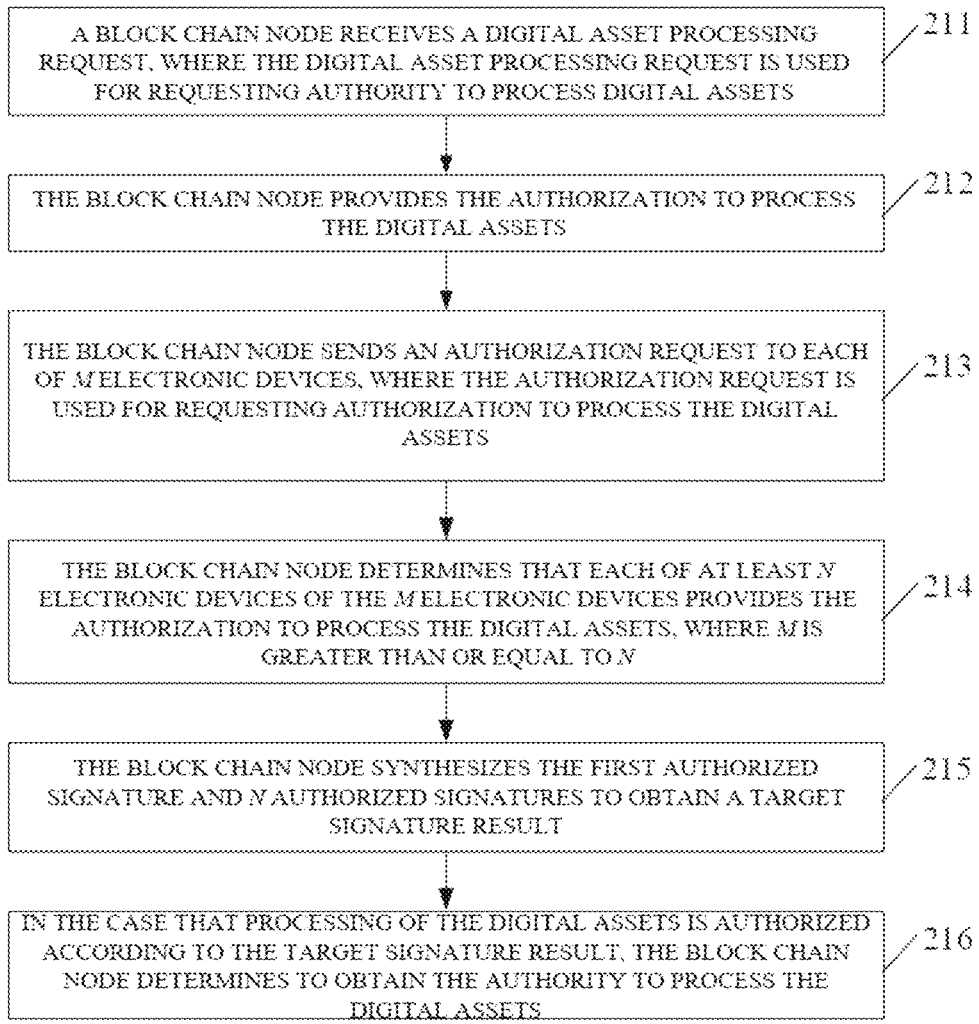
FIG. 2b is a schematic flowchart illustrating a method for information processing according to other embodiments of the present disclosure.

FIG. 2b is a schematic flowchart illustrating a method for information processing according to other embodiments of the present disclosure. The method can be applied to the block chain node in the architecture shown in FIG. 1. As shown in FIG. 2b, the method begins at 211.

At 211, the block chain node receives a digital asset processing request, where the digital asset processing request is used for requesting authority to process digital assets.

In the embodiments of the present disclosure, for the block chain node receiving the digital asset processing request, reference can be made to the implementation of procedure 201 shown in FIG. 2a, which will not be described in detail herein.

At 212, the block chain node provides the authorization to process the digital assets.

In the embodiments of the present disclosure, the block chain node itself can authorize the digital assets. On the one hand, the transaction of the digital assets can be more efficient. On the other hand, illegal users can be prevented from embezzling the identity information of the block chain node to initiate authorization request.

In an implementation, the digital assets are digital assets encrypted by a target public key, and a target private key corresponding to the target public key includes a first decentralized key. The first decentralized key is stored in the block chain node. The block chain node provides the authorization to process the digital assets as follows.

The block chain node signs the digital assets through the first decentralized key to obtain a first authorized key, and determines to provide the authorization to process the digital assets according to the first authorized signature.

In the embodiments of the present disclosure, the block chain node can sign the digital assets through the first decentralized key stored therein. Since the first decentralized key is unique, signing through the first decentralized key can effectively ensure the authenticity of the first authorized signature. According to the embodiments of the present disclosure, the identity information of the block chain node can be effectively prevented from being tampered with, and the security of the transaction process for digital assets can be improved.

At 213, the block chain node sends an authorization request to each of M electronic devices, where the authorization request is used for requesting authorization to process the digital assets.

In the embodiments of the present disclosure, the implementation of the procedure 213 can refer to the implementation of procedure 202 shown in FIG. 2a, and will not be described in detail herein.

At 214, the block chain node determines that each of at least N electronic devices of the M electronic devices provides the authorization to process the digital assets, where M is greater than or equal to N.

In the embodiments of the present disclosure, the implementation of the procedure 214 can refer to the implementation of procedure 203 shown in FIG. 2a, and will not be described in detail herein.

At 215, the block chain node synthesizes the first authorized signature and N authorized signatures to obtain a target signature result.

In the embodiments of the present disclosure, each of the at least N electronic devices corresponds to an authorized signature. In an example, the authorized signature can be attached to the digital assets.

In an implementation, the target private key further includes M decentralized keys, and the M decentralized keys are respectively stored in the M electronic devices. The M decentralized keys are in one-to-one correspondence with the M electronic devices, and N decentralized keys in the M decentralized keys are used for signing the digital assets to obtain N authorized signatures.

After the block chain node determines that each of the at least N electronic devices of the M electronic devices provides the authorization to process the digital assets, the following is further conducted.

The block chain node synthesizes the first authorized signature and the N authorized signatures to obtain a target signature result.

The block chain node determines a synthesized target private key according to the target signature result.

The block chain node determines to obtain the authority to process the digital assets as follows.

The block chain node decrypts the target public key with the synthesized target private key, and determines to obtain the authority to process the digital assets.

The target signature result is obtained by synthesizing the authorized signatures as follows. The block chain node can number at least N authorized signatures and the first authorized signature from the electronic devices, and attach all the at least N authorized signatures and the first authorized signature that are numbered to the digital assets in the form of appendices. The appendices can be regarded as the target signature result. According to the embodiments of the present disclosure, the synthesis of the authorized signatures (the authorized signatures include the first authorized signature and the N authorized signatures) can be conveniently and efficiently achieved in the above manner, improving the efficiency.

As for the sources of the M decentralized keys, reference can be made to the implementation of procedure 203 shown in FIG. 2a, and will not be described in detail herein.

In an example, taking the digital assets as an encrypted file for explanation, the embodiments of the present disclosure provide a method for synthesizing the authorized signatures into the target signature result. Since the authorized signatures are attached to the digital assets and are obtained by signing through decentralized keys, obtaining the target signature result can also be understood as recovering the target private key. Correspondingly, the embodiments of the present disclosure provide a method for recovering the target private key of the digital assets as follows.

In the embodiments of the present disclosure, the method for recovering the target private key of the digital assets can realize the recovery of the target private key through a secure file recovery algorithm. For example, the method for recovering the target private key is realized through the following procedures: extract parameters M+1, N, blocknum, excess, and key information according to a sub-file given, where the sub-file can be understood as a digital asset with a signature result from the electronic device; create a sub-file access table according to the parameters and the key information; create an original file which is empty and fill corresponding bytes of the sub-file into the original file according to the sub-file access table; attach the rest parts of any sub-file to the tail of the original file, to complete the recovery of the original file, where the original file corresponds to the target private key of the original digital assets divided into (M+1) copies. As the digital asset from each electronic device is attached with a corresponding authorized signature, the target private key recovered of the original digital assets is included in the authorized signature from each electronic device. That is, the target signature result is correspondingly obtained when the target private key of the original digital assets is recovered. According to the embodiments of the present disclosure, the target private key of the digital assets can be efficiently and accurately recovered through the secure file recovery algorithm, improving the efficiency. It will be understood that, the embodiments of the present disclosure do not limit how the target signature result is obtained.

In the embodiments of the present disclosure, after the synthesized target private key is obtained, the target public key of the digital assets can be decrypted with the synthesized target private key. As such, the block chain node can obtain the authority to process the digital assets, where the target private key and the target public key are a pair of public keys and private keys corresponding to each other.

According to the embodiments of the present disclosure, by synthesizing the authorized signature of the block chain node and the N authorized signatures of the N electronic devices into the target signature result, and by determining the synthesized target private key according to the target signature result and decrypting the target public key with the synthesized target private key, the authority to process the digital asset can be obtained. The above process is safe and efficient, and thus the security and efficiency of the authorization process of the digital assets can be effectively improved.

At 216, in the case that processing of the digital assets is authorized according to the target signature result, the block chain node determines to obtain the authority to process the digital assets.

In the embodiments of the present disclosure, in the case that processing of the digital assets is authorized according to the target signature result, the implementation for the block chain node to execute the digital asset processing request can refer to the implementation of procedure 104 shown in FIG. 1, and will not be described in detail herein.

In an implementation, after the block chain node obtains the authority to process the digital assets, the following is further conducted.

The block chain node generates a signature record according to the target signature result.

The block chain node stores the signature record to a block chain ledger.

In the embodiments of the present disclosure, the block chain node generates the signature record according to the target signature result. The signature record includes a time record generated according to the target signature result, that is, a timestamp is stamped on the target signature result. The block chain node then stores the signature record to the block chain ledger. Herein, the timestamp can be a self-created timestamp, that is, the timestamp is obtained to a timestamp server through a time receiving device (such as GPS, CDMA, or Beidou satellites), and a timestamp certificate is issued through the timestamp server. The block chain node then obtains the timestamp certificate. Alternatively, the timestamp can be a timestamp with legal effect, that is, the third-party trusted timestamping authentication service in China, which is created by the National Time Service Center of the Chinese Academy of Sciences and Beijing Unitrust Technology Service Co., Ltd. The block chain node then obtains the timestamp. It will be appreciated that, there is no limitation in the embodiments of the present disclosure as to how the timestamp is obtained. According to the embodiments of the present disclosure, the uniqueness of the block chain ledger can be ensured through the timestamp, and false transaction such as information fraud and the like is avoided, and the security of the digital assets is ensured.

In the embodiments of the present disclosure, by authorizing and encrypting the digital assets, and by generating the signature record according to the target signature result and storing the signature record into the block chain ledger, the security of the digital assets can be effectively ensured, and false transaction such as information fraud and the like can be avoided.

According to the embodiments of the present disclosure, the block chain node and the N electronic devices can carry out the authorizing and signing through the decentralized keys stored therein. Due to the non-replicability of the decentralized keys, the authenticity and reliability of the authorized signatures can be ensured, the authorization process can be prevented from being tampered with by illegal users, and the rationality and security of the authorization process can be effectively ensured.

Figure 3:
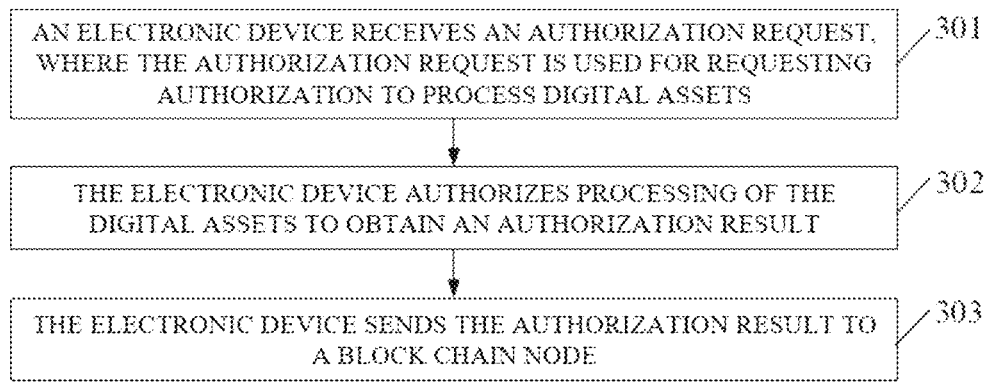
FIG. 3 is a schematic flowchart illustrating a method for information processing according to embodiments of the present disclosure.

FIG. 3 is a schematic flowchart illustrating a method for information processing according to embodiments of the present disclosure. The method can be applied to the electronic device in the architecture shown in FIG. 1. As shown in FIG. 3, the method begins at 301.

At 301, the electronic device receives an authorization request, where the authorization request is used for requesting authorization to process digital assets.

In the embodiments of the present disclosure, the authorization request can be a processing request to authorize, trade, divide, transfer, move, purchase, lease, copy, and/or view the digital assets. It will be appreciated that, the embodiments of the present disclosure do not limit the contents of the authorization request.

At 302, the electronic device authorizes processing of the digital assets to obtain an authorization result.

In the embodiments of the present disclosure, authorizing the digital assets can be understood as sending the authorized signature for the digital assets to the block chain node. The authorization result is a result for authorizing and signing.

In an example, the embodiments of the present disclosure provides a method for authorizing processing of the digital assets, that is, a method for authorizing and signing the digital assets. This method is as follows.

In an implementation, the digital assets are digital assets encrypted by a target public key, and a target private key corresponding to the target public key includes a second decentralized key. The second decentralized key is stored in the electronic device, and the electronic device authorizes processing of the digital assets as follows.

The electronic device signs the digital assets through the second decentralized key to obtain a second authorized signature, and determines to authorize processing of the digital assets according to the second authorized signature.

In the embodiments of the present disclosure, the implementation of the method for authorizing and signing the digital assets can refer to the implementation of procedure 212 shown in FIG. 2b, and will not be described in detail herein. It will be appreciated that, the embodiments of the present disclosure only describes the process of authorizing and signing of any one of the N electronic devices. The process of authorizing and signing of other electronic devices can refer to those of the electronic device, and will not be described in detail herein.

According to the embodiments of the present disclosure, the N electronic devices authorize processing of the digital assets, which can ensure the uniqueness of the digital assets (that is, avoid double spending), prevent a certain party from tampering with the digital assets, and effectively ensure the legitimacy of the digital assets.

At 303, the electronic device sends the authorization result to a block chain node.

In the embodiments of the present disclosure, the electronic device can send the authorization result (i.e. the second authorized signature) to the block chain node.

According to the embodiments of the present disclosure, the electronic device receives the authorization request, signs according to the authorization request, attaches the result for authorizing and signing, and sends the authorization result (i.e. authorized signature) to the block chain node. According to the embodiments of the present disclosure, the authorizing and signing of the digital assets can be efficiently, simply, and securely realized, and the efficiency is effectively improved.

Figure 4:
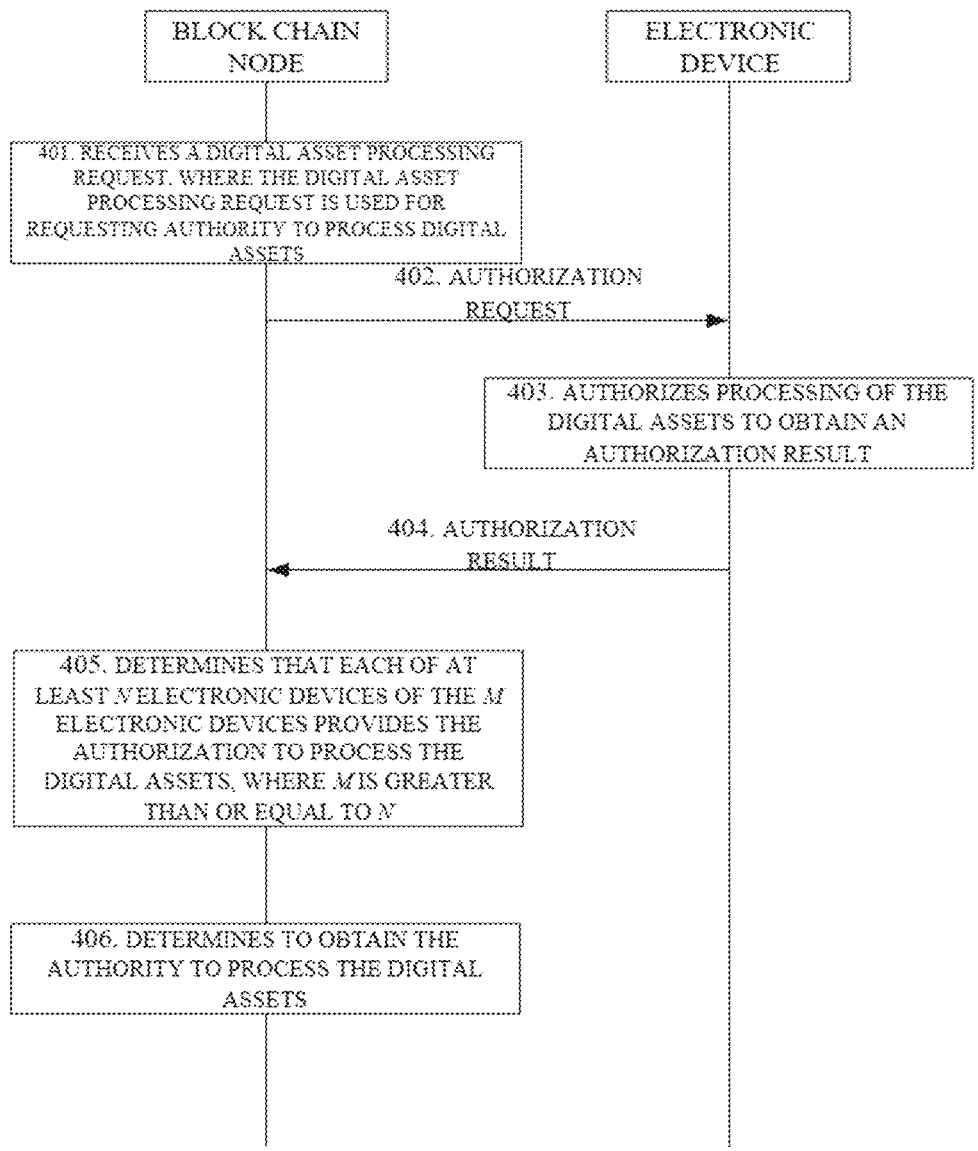
FIG. 4 is a schematic flowchart illustrating a method for information processing according to other embodiments of the present disclosure.

FIG. 4 is a schematic flowchart illustrating a method for information processing according to other embodiments of the present disclosure. The method can be applied to the system shown in FIG. 1. As shown in FIG. 4, the method begins at 401.

At 401, a block chain node receives a digital asset processing request, where the digital asset processing request is used for requesting authority to process digital assets.

Herein, the digital assets can be valuable files such as songs, videos, contracts, data files, etc. The digital asset processing request is a processing request for the authority to authorize, trade, divide, transfer, move, purchase, lease, copy, and/or view the digital assets. It will be appreciated that, the embodiments of the present disclosure do not limit the contents and the processing request of the digital assets.

At 402, the block chain node sends an authorization request to each of M electronic devices, and the electronic device receives the authorization request, where the authorization request is used for requesting authorization to process the digital assets.

In the embodiments of the present disclosure, the electronic device receives the authorization request from the block chain node, where the authorization request is used for authorizing digital assets sent from the block chain node. Herein, the authorization request can be understood as a processing request to authorize, trade, divide, transfer, move, purchase, lease, copy, and/or view the digital assets. It will be appreciated that, the embodiments of the present disclosure do not limit the content of the authorization request.

At 403, the electronic device authorizes processing of the digital assets to obtain an authorization result.

In the embodiments of the present disclosure, if authorizing the digital assets is understood as authorizing and signing the digital assets, the authorization result is the authorized signature. It will be appreciated that, the authorization result can be used for indicating that the block chain node is authorized for processing the digital assets.

At 404, the electronic device sends the authorization result to the block chain node, and the block chain node receives the authorization result sent by the electronic device.

In the embodiments of the present disclosure, the electronic devices can send the information carrying the authorization results (i.e. N authorized signatures) that indicate authorization success to the block chain node.

At 405, the block chain node determines that each of at least N electronic devices of the M electronic devices provides the authorization to process the digital assets, where M is greater than or equal to N.

In the embodiments of the present disclosure, the block chain node can determine whether the number of authorization results from the electronic devices reaches a necessary minimum predetermined number N (i.e., a predetermined authorization ratio). When the number of authorization results reaches N+1 (including the first authorized signature of the block chain node itself), the block chain node can continue to receive the authorization results from the electronic devices, or stop receiving the authorization results. It will be appreciated that, the embodiments of the present disclosure do not limit the number of authorization results received by the block chain node.

At 406, the block chain node determines to obtain the authority to process the digital assets.

In the embodiments of the present disclosure, the block chain node can process the digital asset processing request by using the authorization results whose number reaches the authorization ratio, to realize the operations to authorize, trade, divide, transfer, move, purchase, lease, copy, and/or view the digital assets. It will be appreciated that, the embodiments of the present disclosure do not limit how to process the processing request.

According to the embodiments of the present disclosure, when the block chain node receives the digital asset processing request and the digital asset processing request includes the authorization request, the block chain node can send the authorization request to other block chain nodes. In this way, transaction can be authorized by multi-party by determining a proportion of sign-to-authorize of other block chain nodes, improving the efficiency of multi-party authorization effectively.

It will be appreciated that, the methods shown in FIGS. 1, 2a, 2b, 3 and 4 each have their own emphasis. Therefore, the implementations that are not described in detail in one embodiment may also refer to other embodiments, and will not be described in detail herein.

The method of the embodiments of the present disclosure is described in detail above, and the device of the embodiments of the present disclosure is provided below.

Figure 5:
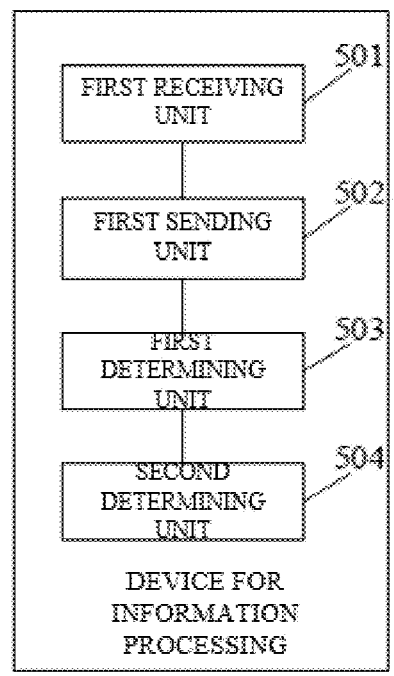
FIG. 5 is a schematic structural diagram illustrating a device for information processing according to embodiments of the present disclosure.

FIG. 5 is a schematic structural diagram illustrating a device for information processing according to embodiments of the present disclosure. The device is configured to perform the methods shown in FIG. 2a and FIG. 2b. As shown in FIG. 5, the device for information processing includes a first receiving unit 501, a first sending unit 502, a first determining unit 503, and a second determining unit 504.

The first receiving unit 501 is configured for a block chain node to receive a digital asset processing request. The digital asset processing request is used for requesting authority to process digital assets.

The first sending unit 502 is configured for the block chain node to send an authorization request to each of M electronic devices upon receiving the digital asset processing request. The authorization request is used for requesting authorization to process the digital assets.

The first determining unit 503 is configured for the block chain node to determine that each of at least N electronic devices of the M electronic devices provides the authorization to process the digital assets, where M is greater than or equal to N.

The second determining unit 504 is configured for the block chain node to determine to obtain the authority to process the digital assets.

According to the embodiments of the present disclosure, when a block chain node initiates a digital asset processing request and the digital asset processing request includes an authorization request, the block chain node can send the authorization request to other electronic devices to avoid problem of double spending, and achieve multi-party authorization transaction by determining a proportion of sign-to-authorize of other electronic devices, improving the efficiency of multi-party authorization effectively.

Figure 6:
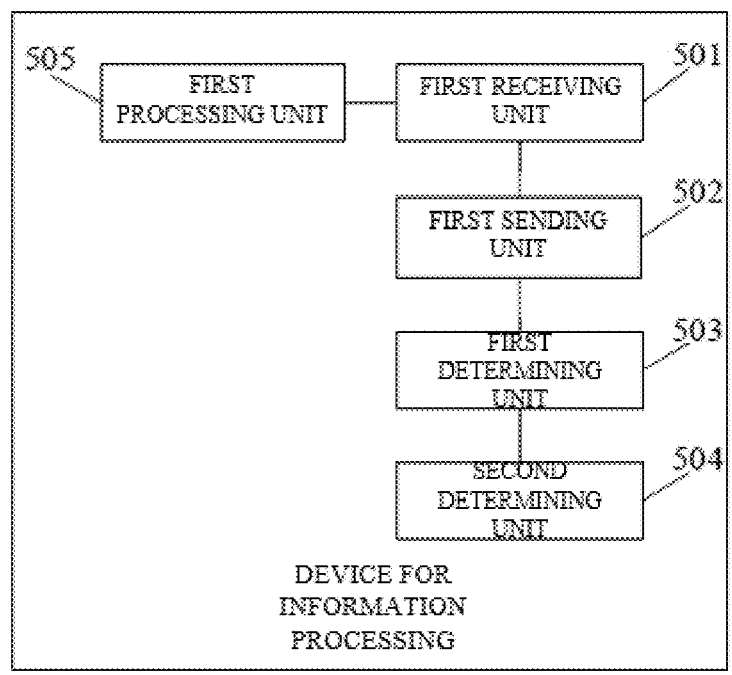
FIG. 6 is a schematic structural diagram illustrating a device for information processing according to other embodiments of the present disclosure.

FIG. 6 is a schematic structural diagram illustrating a device for information processing according to other embodiments of the present disclosure. As shown in FIG. 6, the device further includes a first processing unit 505.

The first processing unit 505 is configured for the block chain node to provide the authorization to process the digital assets.

The second determining unit 504 is configured for the block chain node to determine to obtain the authority to process the digital assets when the block chain node provides the authorization to process the digital assets.

As shown in FIG. 6, the first processing unit 505 is configured for the block chain node to sign the digital assets through the first decentralized key to obtain a first authorized key, and to determine to authorize processing of the digital assets according to the first authorized signature.

Figure 7:
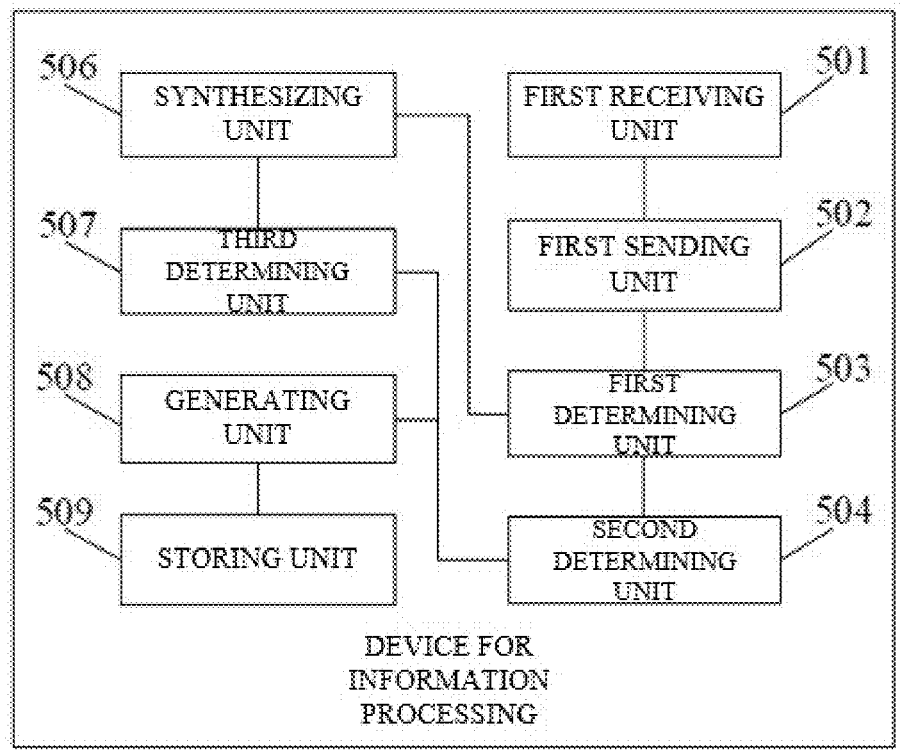
FIG. 7 is a schematic structural diagram illustrating a device for information processing according to other embodiments of the present disclosure.

FIG. 7 is a schematic structural diagram illustrating a device for information processing according to other embodiments of the present disclosure. As shown in FIG. 7, the device further includes a synthesizing unit 506, and a third determining unit 507.

The synthesizing unit 506 is configured for the block chain node to synthesize a first authorized signature and N authorized signatures into a target signature result.

The third determining unit 507 is configured for the block chain node to determine a target private key according to the target signature result.

The second determining unit 504 is further configured for the block chain node to decrypt the target public key with the target private key, and to determine to obtain the authority to process the digital assets.

As shown in FIG. 7, the device further includes a generating unit 508 and a storing unit 509.

The generating unit 508 is configured for the block chain node to generate a signature record according to the target signature result.

The storing unit 509 is configured for the block chain node to store the signature record to a block chain ledger.

It will be understood that, the implementation of the device for information processing shown in FIGS. 5, 6, and 7 may also refer to the method shown in FIG. 2a and FIG. 2b, and will not be described in detail herein.

Figure 8:
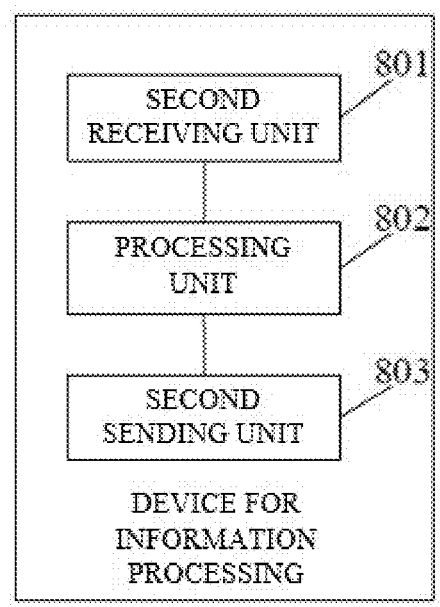
FIG. 8 is a schematic structural diagram illustrating a device for information processing according to embodiments of the present disclosure.

FIG. 8 is a schematic structural diagram illustrating a device for information processing according to embodiments of the present disclosure. The device may be configured to perform the method shown in FIG. 3. As illustrated in FIG. 8, the device for information processing includes a second receiving unit 801, a processing unit 802, and a second sending unit 803.

The second receiving unit 801 is configured for an electronic device to receive an authorization request, where the authorization request is used for requesting authorization to process digital assets.

The processing unit 802 is configured for the electronic device to authorize processing of the digital assets to obtain an authorization result.

The second sending unit 803 is configured for the electronic device to send the authorization result to a block chain node.

As shown in FIG. 8, the processing unit 802 is configured for the electronic device to sign the digital assets through the second decentralized key to obtain a second authorized signature, and to determine to authorize processing of the digital assets according to the second authorized signature.

In the embodiments of the present disclosure, the electronic device receives the authorization request and encrypts the digital assets in the authorization request and attach the result for authorizing and signing. The electronic device sends the authorization result (i.e. authorized signature) to the block chain node. According to the embodiments of the present disclosure, the authorizing and signing of the digital assets can be efficiently, simply, and securely realized, and the efficiency can be effectively improved.

It will be understood that, the implementation of the device for information processing shown in FIG. 8 may also refer to the method shown in FIG. 3, and will not be described in detail herein.

Figure 9:
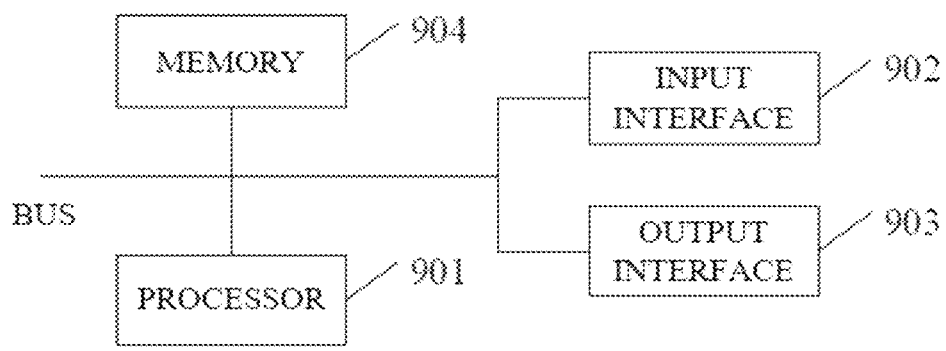
FIG. 9 is a schematic structural diagram illustrating a device for information processing according to other embodiments of the present disclosure.

FIG. 9 is a schematic structural diagram illustrating a device for information processing according to other embodiments of the present disclosure. The device for information processing includes a processor 901, and may also include an input interface 902, an output interface 903, and a memory 904. The input interface 902, the output interface 903, the memory 904, and the processor 901 are interconnected by a bus.

The memory includes, but is not limited to, a random access memory (RAM), a read-only memory (ROM), an erasable programmable read-only memory (EPROM), or a compact disc read-only memory (CD-ROM). The memory is configured for storing related instructions and data.

The input interface is configured for inputting data and/or signals, and the output interface is configured for outputting data and/or signals. The output interface and the input interface can be independent devices or can be a single device.

The processor may include one or more processors, for example, one or more central processing units (CPU). In the case of a processor being a CPU, the processor may be either a single-core CPU or a multi-core CPU.

The memory is configured to store program codes and data of the device for information processing.

The processor is configured to invoke the program codes and data in the memory to perform the steps in the above method embodiment.

In an example, the processor may be configured to perform the implementations of steps 202 to 204. The processor may also be configured to perform the implementations of steps 211, 212, and 214 to 216. The processor may also be configured to perform the implementations of steps 301 to 302. The processor may also be configured to perform the implementations of steps 401, 403, and 406.

In another example, the processor may also be configured to perform the methods shown by the first determining unit 503 and the second determining unit 504, and the like.

In another example, in some possible implementations, the input interface may be configured to perform the methods shown by the first receiving unit 501. The output interface may also be configured to perform the methods shown by the first sending unit 502.

In another example, the processor may also be configured to perform the methods shown by the processing unit 802 and the like.

In another example, in some possible implementations, the input interface may be configured to perform the methods shown by the second receiving unit 801. The output interface may also be configured to perform the methods shown by the second sending unit 803.

Specific implementations of the processor and/or the input/output interface can be described in the embodiments and will not be described herein.

It will be understood that, FIG. 9 only shows a simplified design of the device for information processing. In practical application, the device for information processing may also include other necessary components. The components includes, but is not limited to, any number of input/output interfaces, processors, controllers, memories, etc. All the devices for information processing that can implement embodiments of the present disclosure are within the scope of protection of the present disclosure.

Embodiments of this disclosure further provide a non-transitory computer readable storage medium. The non-transitory computer readable storage medium is configured to store a computer program which, when executed by a processor, the processor is configured to execute the method described above.

It will be apparent to those skilled in the art that, for convenience and brevity of description, specific processes of operation of the devices and units may be referred to corresponding processes in the aforementioned embodiments, and will not be described herein.

It will be appreciated by those of ordinary skill in that art, all or part of the flow in the method for implementing the above embodiments may be accomplished by a computer program instructing relevant hardware. The program may be stored in a computer readable storage medium, and when executed, the program may include the flow as described above in various embodiments. The aforementioned storage media include a ROM or RAM, a magnetic disk or optical disk, and other media that can store program codes.

What is claimed is:

1. A method for information processing, comprising:
   receiving, by a block chain node, a digital asset processing request, wherein the digital asset processing request is used for requesting authority to process digital assets;
   sending, by the block chain node, an authorization request to each of M electronic devices upon receiving the digital asset processing request, wherein the authorization request is used for requesting authorization to process the digital assets;
   determining, by the block chain node, that each of at least N electronic devices of the M electronic devices provides the authorization to process the digital assets, wherein M is greater than or equal to N; and determining, by the block chain node, that the authority to process the digital assets is obtained, wherein before determining, by the block chain node, that the authority to process the digital assets is obtained, the method further comprises: providing, by the block chain node, the authorization to process the digital assets, the digital assets are digital assets encrypted by a target public key, a target private key corresponding to the target public key comprises a first decentralized key, and the first decentralized key is stored in the block chain node, and said providing the authorization to process the digital assets by the block chain node, comprises:

obtaining a first authorized signature by signing the digital assets with the first decentralized key by the block chain node; and determining that the block chain node provides the authorization to process the digital assets, according to the first authorized signature.

2. The method of claim 1, wherein the target private key further comprises M decentralized keys, and the M decentralized keys are stored in the M electronic devices respectively, and the M decentralized keys are in one-to-one correspondence with the M electronic devices, and N decentralized keys in the M decentralized keys are used for signing the digital assets to obtain N authorized signatures, wherein the method further comprises:

after determining, by the block chain node, that each of the at least N electronic devices of the M electronic devices provides the authorization to process the digital assets, synthesizing, by the block chain node, the first authorized signature and the N authorized signatures to obtain a target signature result; and synthesizing, by the block chain node, the target private key according to the target signature result to obtain a synthesized target private key; and said determining, by the block chain node, that the authority to process the digital assets is obtained comprises:

determining that the authority to process the digital assets is obtained when the digital assets are decrypted with the synthesized target private key.

3. The method of claim 2, further comprising:

after determining that the authority to process the digital assets is obtained, generating, by the block chain node, a signature record according to the target signature result; and storing, by the block chain node, the signature record to a block chain ledger.

4. A method for information processing, comprising:

receiving, by an electronic device, an authorization request, wherein the authorization request is used for requesting authorization to process digital assets;

authorizing, by the electronic device, processing of the digital assets and obtaining an authorization result;

sending, by the electronic device, the authorization result to a block chain node;

wherein the digital assets are digital assets encrypted by a target public key, a target private key corresponding to the target public key comprises a first decentralized key, the first decentralized key is stored in the electronic device, and said authorizing, by the electronic device, processing of the digital assets to obtain the authorization result comprises:

signing, by the electronic device, the digital assets with the first decentralized key to obtain a first authorized signature; and determining to authorize processing of the digital assets according to the first authorized signature.

5. A non-transitory computer readable storage medium storing a computer program which, when executed by a processor, the processor is configured to:

receive a digital asset processing request, wherein the digital asset processing request is used for requesting authority to process digital assets;

send an authorization request to each of M electronic devices upon receiving the digital asset processing request, wherein the authorization request is used for requesting authorization to process the digital assets;

determine that each of at least N electronic devices of the M electronic devices provides the authorization to process the digital assets, wherein M is greater than or equal to N; and determine that the authority to process the digital assets is obtained, wherein the processor is further configured to provide the authorization to process the digital assets, the digital assets are digital assets encrypted by a target public key, a target private key corresponding to the target public key comprises a first decentralized key, and the first decentralized key is stored in a block chain node, and the computer program executed by the processor to provide the authorization to process the digital assets is executed by the processor to:

obtain a first authorized signature by signing the digital assets with the first decentralized key; and determine that the block chain node provides the authorization to process the digital assets, according to the first authorized signature.

6. The non-transitory computer readable storage medium of claim 5, wherein the target private key further comprises M decentralized keys, and the M decentralized keys are stored in the M electronic devices respectively, and the M decentralized keys are in one-to-one correspondence with the M electronic devices, and N decentralized keys in the M decentralized keys are used for signing the digital assets to obtain N authorized signatures, wherein the computer program, when executed by the processor, the processor is further configured to:

synthesize the first authorized signature and the N authorized signatures to obtain a target signature result; and synthesize the target private key according to the target signature result to obtain a synthesized target private key; and the computer program executed by the processor to determine that the authority to process the digital assets is obtained is executed by the processor to:

determine that the authority to process the digital assets is obtained when the digital assets are is decrypted with the synthesized target private key.

7. The non-transitory computer readable storage medium of claim 5, wherein the computer program, when executed by the processor, the processor is further configured to:

generate a signature record according to the target signature result; and store the signature record to a block chain ledger.

* * * * *